(12) United States Patent
McClure

(10) Patent No.: US 10,571,576 B2
(45) Date of Patent: *Feb. 25, 2020

(54) PORTABLE BASE STATION NETWORK FOR LOCAL DIFFERENTIAL GNSS CORRECTIONS

(71) Applicant: AgJunction LLC, Hiawatha, KS (US)

(72) Inventor: John A. McClure, Scottsdale, AZ (US)

(73) Assignee: AGJUNCTION LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,317

(22) Filed: Jan. 9, 2018

(65) Prior Publication Data

US 2018/0156918 A1 Jun. 7, 2018

Related U.S. Application Data

(63) Continuation of application No. 15/017,445, filed on Feb. 5, 2016, now Pat. No. 9,903,953, which is a (Continued)

(51) Int. Cl.
*G01S 19/07* (2010.01)
*G01S 19/13* (2010.01)

(52) U.S. Cl.
CPC ............. *G01S 19/07* (2013.01); *G01S 19/13* (2013.01)

(58) Field of Classification Search
CPC ... G01S 5/021; G01S 5/02; G01S 5/06; G01S 1/026; G01S 5/0221; G01S 5/0284;
(Continued)

(56) References Cited

U.S. PATENT DOCUMENTS 4,963,889 A 10/1990 Hatch
5,021,792 A 6/1991 Hwang
(Continued)

FOREIGN PATENT DOCUMENTS

AU 2002244539 B2 10/2002
WO 1998/036288 A1 8/1998
(Continued)

OTHER PUBLICATIONS

Extended European Search Report for Application No. 10751234.5; dated Jul. 19, 2012; 9 pages.
(Continued)

*Primary Examiner* — Allahyar Kasraian
(74) *Attorney, Agent, or Firm* — Schwabe Williamson & Wyatt

(57) ABSTRACT

A DGNSS-based guidance system, wherein a rover receiver first utilizes data from a master base station transceiver, a DGNSS reference network, or some other differential source to compute a differentially corrected location to establish a reference DGNSS relationship. Using this location and data observed only at the rover, the rover computes an internal set of differential corrections, which set is stored in computer memory, updated as necessary, and applied in future times to correct observations taken by the rover. As the rover enters into areas of other base station receiver reference networks, the rover transceiver will send positional information it receives from the master base station to the new, secondary base station. The secondary base station then calibrates its own reference information using information sent from the original master base station.

20 Claims, 7 Drawing Sheets

Related U.S. Application Data continuation of application No. 14/457,987, filed on Aug. 12, 2014, now Pat. No. 9,255,992, application No. 15/866,317, which is a continuation of application No. 14/457,987, filed on Aug. 12, 2014, now Pat. No. 9,255,992, which is a continuation of application No. 13/300,609, filed on Nov. 20, 2011, now Pat. No. 8,803,735.

(60) Provisional application No. 61/415,693, filed on Nov. 19, 2010.

(58) Field of Classification Search
CPC ............ G01S 2205/008; G01S 5/0268; G01S 19/252; G01S 19/07; G01S 19/13; H04W 64/00; H04W 4/02; H04W 4/029; H04W 4/22

See application file for complete search history.

(56) References Cited

U.S. PATENT DOCUMENTS

| | | |
|---|---|---|
| 5,194,851 A | 3/1993 | Kraning et al. |
| 5,390,125 A | 2/1995 | Sennott et al. |
| 5,404,661 A | 4/1995 | Sahm |
| 5,430,654 A | 7/1995 | Kyrtsos |
| 5,612,864 A | 3/1997 | Henderson |
| 5,619,211 A | 4/1997 | Horkin |
| 5,646,844 A | 7/1997 | Gudat |
| 5,663,879 A | 9/1997 | Trovato et al. |
| 5,828,336 A | 10/1998 | Yunck |
| 5,854,987 A | 12/1998 | Sekine |
| 5,875,408 A | 2/1999 | Bendett |
| 5,923,270 A | 7/1999 | Sampo et al. |
| 5,955,973 A | 9/1999 | Anderson |
| 6,052,647 A | 4/2000 | Parkinson et al. |
| 6,070,673 A | 6/2000 | Wendte |
| 6,073,070 A | 6/2000 | Diekhans |
| 6,095,439 A | 8/2000 | Segal |
| 6,100,842 A | 8/2000 | Dreier |
| 6,198,430 B1 | 3/2001 | Hwang |
| 6,212,453 B1 | 4/2001 | Kawagoe et al. |
| 6,266,595 B1 | 7/2001 | Greatline |
| 6,313,788 B1 | 11/2001 | Wilson |
| 6,373,432 B1 | 4/2002 | Rabinowitz et al. |
| 6,377,889 B1 | 4/2002 | Soest |
| 6,421,003 B1 | 7/2002 | Riley |
| 6,445,983 B1 | 9/2002 | Dickson et al. |
| 6,445,990 B1 | 9/2002 | Manring |
| 6,463,374 B1 | 10/2002 | Keller |
| 6,466,162 B2 * | 10/2002 | Boman ............... A63B 24/0021 342/357.34 |
| 6,515,619 B1 | 2/2003 | McKay, Jr. |
| 6,539,303 B2 | 3/2003 | McClure et al. |
| 6,542,077 B2 | 4/2003 | Joao |
| 6,553,299 B1 | 4/2003 | Keller |
| 6,711,501 B2 | 3/2004 | McClure et al. |
| 6,789,014 B1 | 9/2004 | Rekow et al. |
| 6,804,587 B1 | 10/2004 | O Connor |
| 6,819,780 B2 | 11/2004 | Benson et al. |
| 6,865,465 B2 | 3/2005 | McClure |
| 6,876,920 B1 | 4/2005 | Mailer |
| 7,110,762 B1 | 9/2006 | Cameron |
| 7,142,956 B2 | 11/2006 | Heiniger et al. |
| 7,162,348 B2 | 1/2007 | McClure et al. |
| 7,277,792 B2 | 10/2007 | Overschie |
| 7,298,325 B2 | 11/2007 | Krikorian |
| 7,373,231 B2 | 5/2008 | McClure et al. |
| 7,400,956 B1 | 7/2008 | Feller et al. |
| 7,437,230 B2 | 10/2008 | McClure |
| 7,460,942 B2 | 12/2008 | Mailer |
| 7,511,667 B2 | 3/2009 | Matsuoka |
| 7,689,354 B2 | 3/2010 | Heiniger et al. |
| RE41,358 E | 5/2010 | Heiniger et al. |
| 7,835,832 B2 | 11/2010 | Macdonald et al. |
| 7,852,267 B2 * | 12/2010 | Duffett-Smith ......... G01S 19/05 342/463 |
| 7,860,628 B2 | 12/2010 | Lange |
| 7,885,745 B2 | 2/2011 | McClure et al. |
| 8,018,376 B2 | 9/2011 | McClure et al. |
| 8,140,223 B2 | 3/2012 | Whitehead |
| 8,190,337 B2 | 5/2012 | McClure |
| 8,214,111 B2 | 7/2012 | Heiniger et al. |
| 8,265,826 B2 | 9/2012 | Feller |
| 8,311,696 B2 | 11/2012 | Reeve |
| 8,386,129 B2 | 2/2013 | Collins et al. |
| 8,401,704 B2 | 3/2013 | Pollock et al. |
| 8,437,901 B2 | 5/2013 | Anderson |
| 8,489,291 B2 | 7/2013 | Dearborn et al. |
| 8,521,372 B2 | 8/2013 | Hunt et al. |
| 8,548,649 B2 | 10/2013 | Guyette et al. |
| 8,583,315 B2 | 11/2013 | Whitehead et al. |
| 8,583,326 B2 | 11/2013 | Collins et al. |
| 8,589,013 B2 | 11/2013 | Pieper et al. |
| 8,594,879 B2 | 11/2013 | Roberge et al. |
| 8,634,993 B2 | 1/2014 | McClure et al. |
| 8,639,416 B2 | 1/2014 | Jones et al. |
| 8,649,930 B2 | 2/2014 | Reeve et al. |
| 8,676,620 B2 | 3/2014 | Hunt et al. |
| 8,718,874 B2 | 5/2014 | McClure et al. |
| 8,768,558 B2 | 7/2014 | Reeve et al. |
| 8,781,685 B2 | 7/2014 | McClure |
| 8,803,735 B2 | 8/2014 | McClure |
| 8,897,973 B2 | 11/2014 | Hunt et al. |
| 8,924,152 B2 | 12/2014 | Hunt et al. |
| 9,002,565 B2 | 4/2015 | Jones et al. |
| 9,002,566 B2 | 4/2015 | McClure et al. |
| 9,141,111 B2 | 9/2015 | Webber et al. |
| 9,162,703 B2 | 10/2015 | Miller et al. |
| 9,173,337 B2 | 11/2015 | Guyette et al. |
| 9,223,314 B2 | 12/2015 | McClure et al. |
| 9,255,992 B2 | 2/2016 | McClure |
| 9,389,615 B2 | 7/2016 | Webber et al. |
| 2002/0072850 A1 | 6/2002 | McClure et al. |
| 2002/0107609 A1 | 8/2002 | Benneweis |
| 2003/0187560 A1 | 10/2003 | Keller |
| 2004/0186644 A1 | 9/2004 | McClure et al. |
| 2005/0037775 A1 * | 2/2005 | Moeglein ............... G01S 5/0036 455/456.1 |
| 2006/0167600 A1 | 7/2006 | Nelson, Jr. et al. |
| 2007/0267524 A1 | 11/2007 | Mack |
| 2008/0195268 A1 | 8/2008 | Sapilewski |
| 2009/0102708 A1 * | 4/2009 | Dai ............... G01S 19/41 342/357.24 |
| 2009/0121932 A1 | 5/2009 | Whitehead |
| 2009/0322600 A1 | 12/2009 | Whitehead |
| 2010/0185366 A1 | 7/2010 | Heiniger |
| 2010/0190509 A1 * | 7/2010 | Davis ............... H04W 56/006 455/456.1 |
| 2010/0274452 A1 | 10/2010 | Ringwald et al. |
| 2010/0323723 A1 * | 12/2010 | Gerstenberger ...... G01S 5/0226 455/456.5 |
| 2011/0015817 A1 | 1/2011 | Reeve |
| 2011/0018765 A1 | 1/2011 | Whitehead |
| 2012/0086598 A1 | 4/2012 | Aghili |
| 2012/0093143 A1 * | 4/2012 | Sun ............... H04B 7/024 370/338 |
| 2012/0127032 A1 | 5/2012 | McClure |
| 2012/0139784 A1 | 6/2012 | Ashjaee |
| 2012/0154214 A1 | 6/2012 | Leandro |
| 2012/0154215 A1 | 6/2012 | Vollath |
| 2013/0027245 A1 | 1/2013 | Lennen |
| 2013/0069822 A1 | 3/2013 | Wu |
| 2013/0106657 A1 * | 5/2013 | Perthold ............... G01S 5/021 342/387 |
| 2014/0214275 A1 | 7/2014 | Miller |
| 2014/0266877 A1 | 9/2014 | McClure |
| 2014/0277676 A1 | 9/2014 | Gattis |
| 2014/0292569 A1 | 10/2014 | Wallace |
| 2014/0292570 A1 | 10/2014 | Wallace |
| 2014/0347217 A1 | 11/2014 | McClure |
| 2015/0175194 A1 | 6/2015 | Gattis |
| 2016/0039454 A1 | 2/2016 | Mortimer |
| 2016/0154108 A1 | 6/2016 | McClure et al. |

(56) References Cited

U.S. PATENT DOCUMENTS

| | | |
|---|---|---|
| 2016/0205864 A1 | 7/2016 | Gattis et al. |
| 2016/0214643 A1 | 7/2016 | Joughin et al. |
| 2016/0252909 A1 | 9/2016 | Webber et al. |
| 2016/0334804 A1 | 11/2016 | Webber et al. |

FOREIGN PATENT DOCUMENTS

| | | |
|---|---|---|
| WO | 2000/024239 A1 | 5/2000 |
| WO | 2003/019430 A1 | 3/2003 |
| WO | 2010/005945 A1 | 1/2010 |
| WO | 2011/014431 A1 | 2/2011 |

OTHER PUBLICATIONS

International Search Report and Written Opinion for PCT/AU2008/000002, dated Mar. 5, 2008; 8 pages.

International Search Report and Written Opinion for PCT/US2010/021334 dated Mar. 12, 2010; 9 pages.

International Search Report and Written Opinion for PCT/US2010/043094 dated Sep. 17, 2010; 6 pages.

International Search Report and Written Opinion for PCT/US2014/058659 dated Mar. 3, 2015; 10 pages.

International Search Report for PCT/US2009/033693 dated Apr. 4, 2009, 3 pages.

International Search Report for PCT/US2009/039686 dated May 26, 2009; 3 pages.

International Search Report for PCT/US2009/049776.

International Search Report for PCT/US2009/060668 dated Dec. 9, 2009; 7 pages.

Van Zuydam,. R.P., Centimeter-Precision Guidante of Agricultural Impleet ns in the Open Field by Means of Real Tim Kinematic DGPS, ASA-CSSA-SSSA, pp. 1023-1034 (1999).

Noh, Kwang-Mo, Self-tuning controller for farm tractor guidance, Iowa State University Retrospective Theses and Dissertations, Paper 9874, (1990).

Van Zuydam,. R.P., Centimeter-Precision Guidance of Agricultural Implements in the Open Field by Means of Real Tim Kinematic DGPS, ASA-CSSA-SSSA, pp. 1023-1034 (1999).

* cited by examiner

GNSS BASE STATIONS

Rover (X.1,Y.1,Z.1)
Synch on Base 1

Overlap Base 1/Base 2
Rover Receives Dif. Correctors from Both

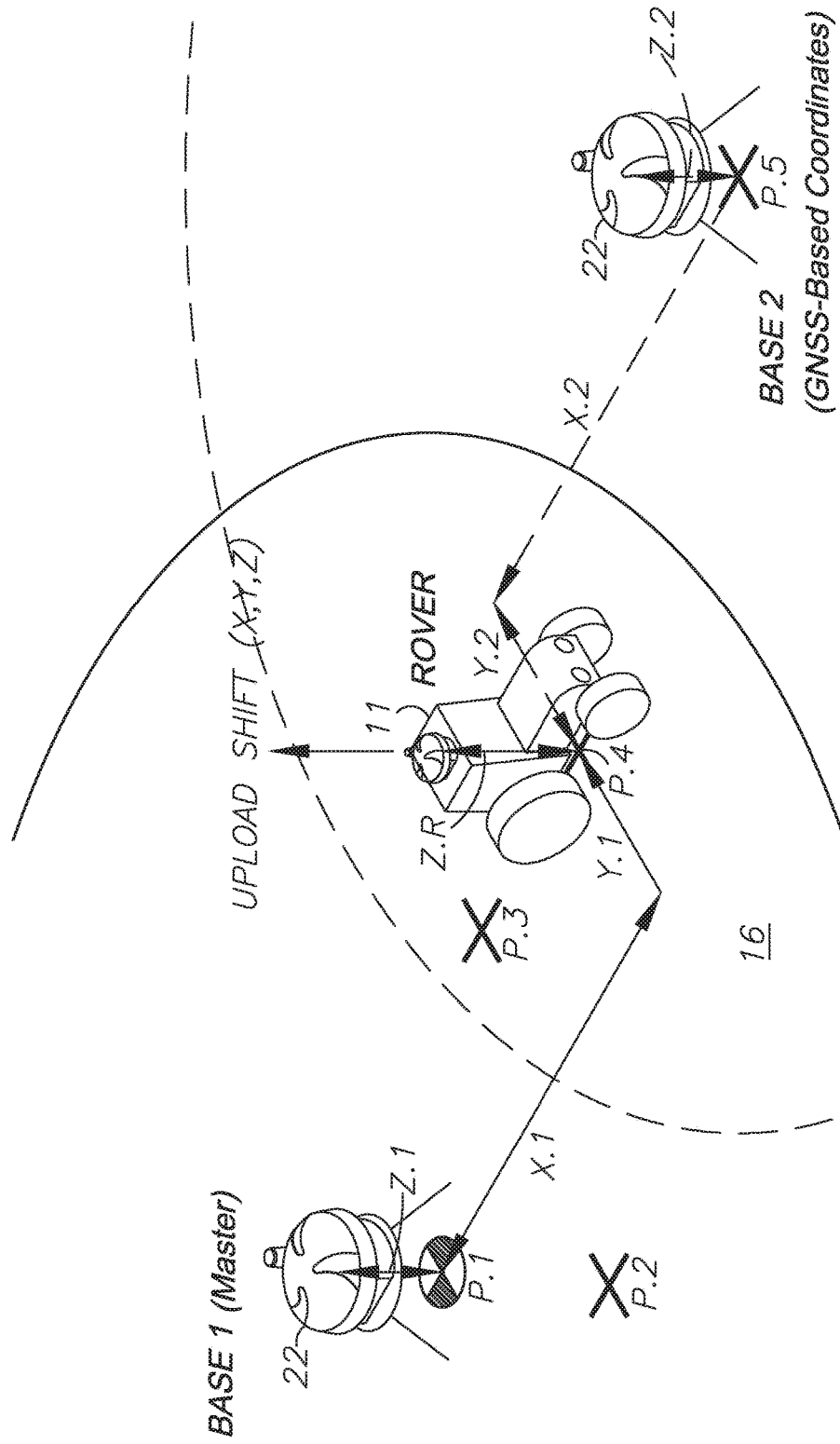

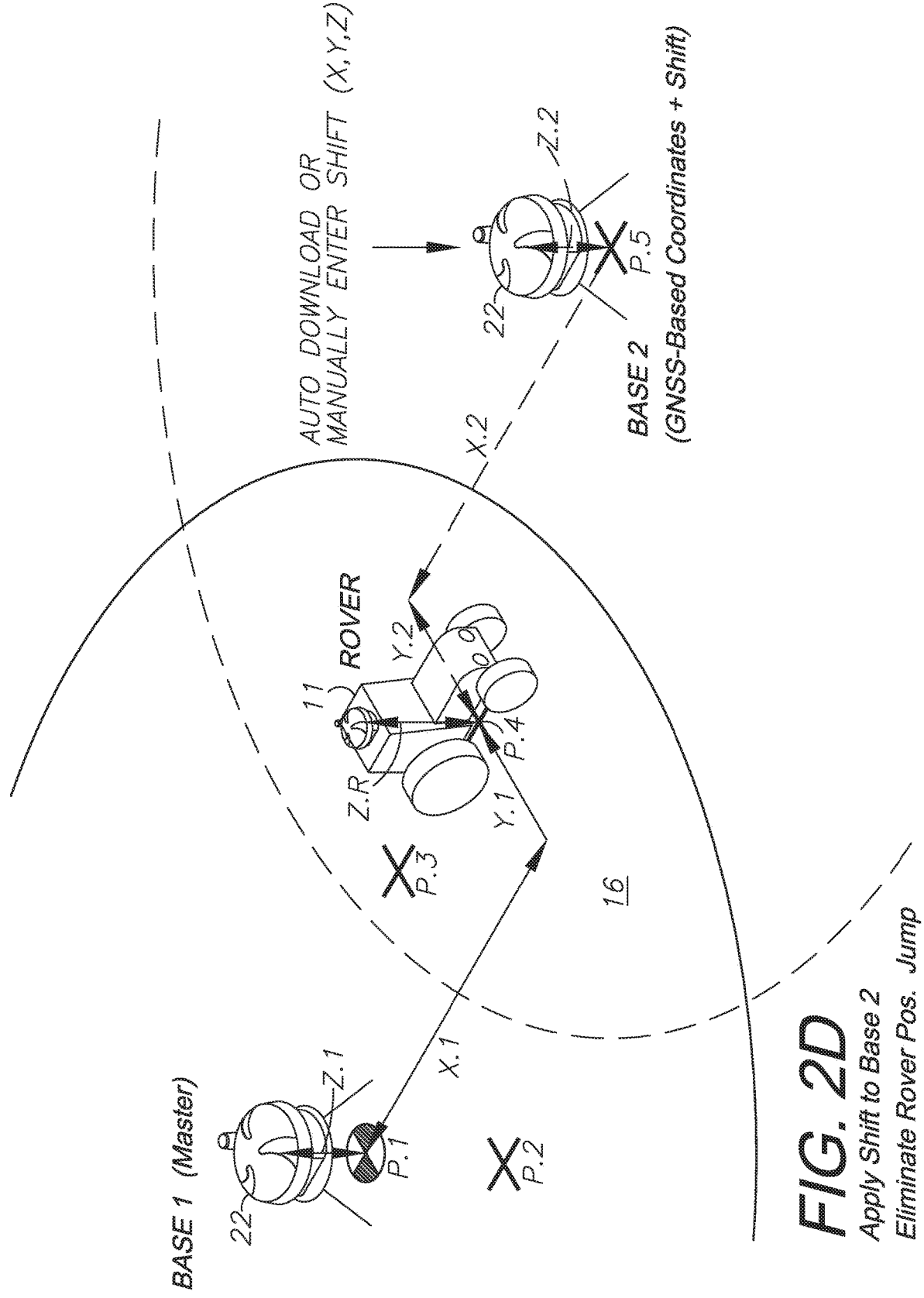

Rover Reenters Base1/Base 2 Overlap

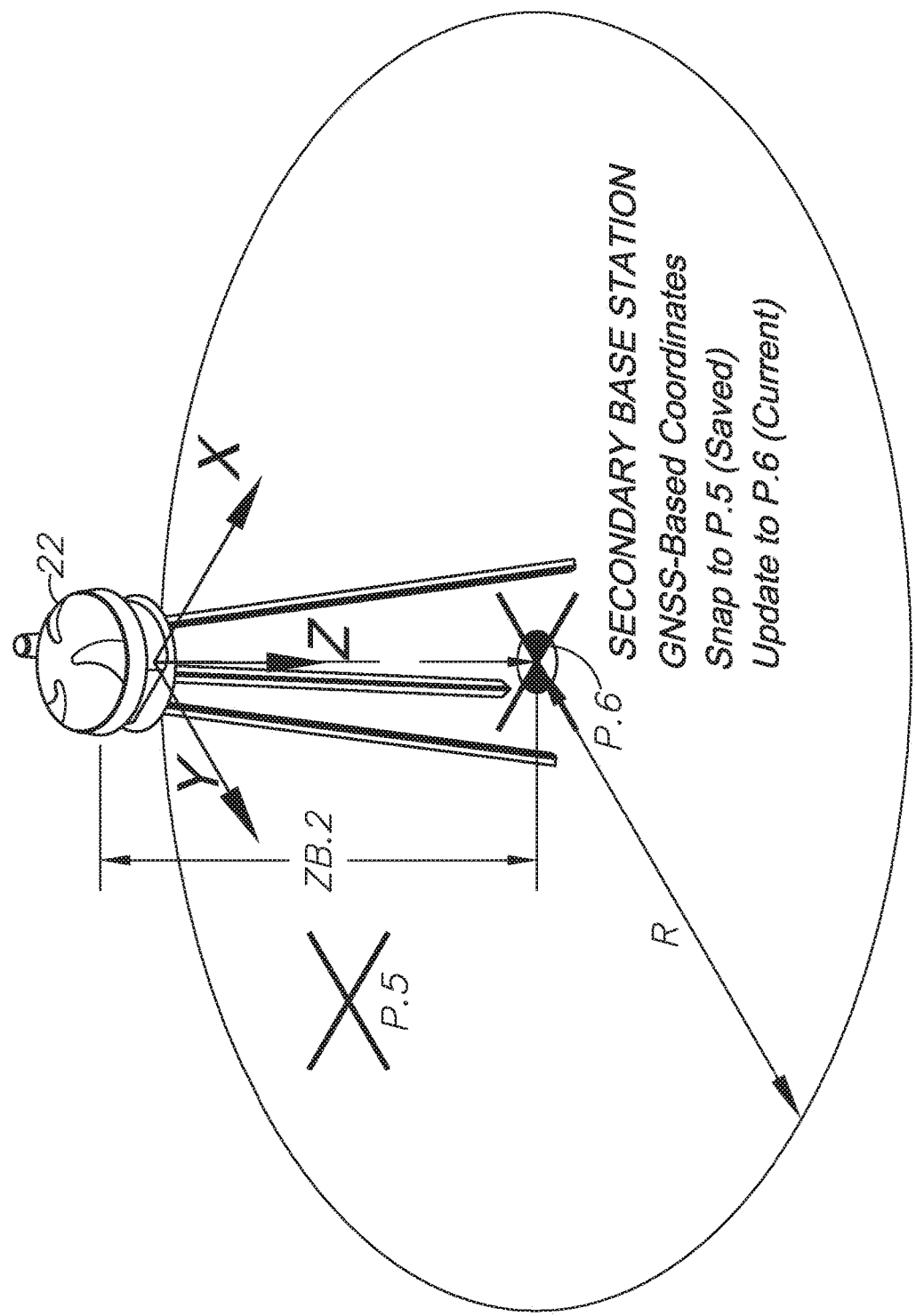

PORTABLE BASE STATION NETWORK FOR LOCAL DIFFERENTIAL GNSS CORRECTIONS

CROSS-REFERENCE TO RELATED APPLICATION

This application is a continuation of U.S. patent application Ser. No. 15/017,445; filed Feb. 5, 2016 which is a continuation of U.S. patent application Ser. No. 14/457,987 filed Aug. 12, 2014, now U.S. Pat. No. 9,255,992; issued Feb. 9, 2016, which is a continuation of and claims priority in U.S. patent application Ser. No. 13/300,609, filed Nov. 20, 2011, now U.S. Pat. No. 8,803,735, issued Aug. 12, 2014, which claims priority to U.S. Provisional Patent Application Ser. No. 61/415,693, filed Nov. 19, 2010, all of which are incorporated herein by reference in their entireties.

BACKGROUND OF THE INVENTION

1. Field of the Invention

The present invention relates generally to Global Navigation Satellite System (GNSS) base stations, and in particular to calibrating a network of portable, secondary base or reference stations in relation to a master base station for differential GNSS correction over a coverage region comprising multiple overlapping coverage polygons.

2. Description of the Related Art

Differential GNSS techniques have been successfully applied for a number of years. These techniques, for example, enable accurate real-time positioning of a rover receiver relative to a base receiver. This positioning includes code-only or carrier-smoothed-code differential techniques that result in sub-meter accuracy, such as those employed while operating with older RTCM 104 messages. They include carrier phase based techniques that facilitate centimeter-level real-time kinematic (RTK) positioning.

Differential GNSS (DGNSS), as its name implies, requires that data be differenced. One of the most useful differences in DGNSS, and therefore a widely used difference, is that of differencing two similar observations of satellite ranging signals where one observation is made at a base or reference GNSS receiver and another is made at a rover GNSS receiver. This type of difference, commonly referred to as the single-difference, removes common-mode errors (i.e. errors seen by both base and rover receivers) such as satellite orbit errors, satellite clock errors, and atmospheric errors that arise as the signal passes through the ionosphere and the troposphere. The remaining sources of error that result when employing single-difference techniques are those that are unique to the receiver, such as receiver noise and multipath. These remaining errors are often small in comparison to the common-mode errors, especially when carrier-phase observations are employed. Left unchecked, these errors can, over time, result in relatively large inaccuracies in the differential signals provided by base stations. In DGPS/DGNSS systems, a stationary base receiver uses its known location as a reference for computing differential corrections that correct errors in its own phase observations, and these corrections are then supplied over a communication link to a rover to correct similar errors seen at the rover. Alternatively, the base station supplies its reference location and phase observations over the communication link to the rover for computing the differential corrections itself, or takes a mathematically equivalent approach of forming single-differences between base and rover observations.

It is common practice to obtain differential position information using base stations to provide the additional signals to GNSS satellite positional signals. These base stations typically use either known GNSS position coordinates selected from a list of previously used coordinates or automatically-generated coordinates calculated by averaging GNSS-based position data. However, when a master and multiple secondary base stations are used for covering a large region, one base station's coordinate system may not line up with another base station's system. Thus, when a working vehicle travels from one base station signal coverage area to another, the positions computed by a guidance CPU within the working vehicle may suddenly "jump" when transitioning to the coverage area of the new GNSS base station. The vehicle (e.g., tractor/implement) may be guided along a guide path based on the new base station differential positioning data which does not line up with the previous path, resulting in uneven rows within a field.

To address this problem, Whitehead and McClure U.S. Pat. No. 7,400,294, which is assigned to a common assignee and is incorporated herein by reference, discloses portable reference stations for local differential GPS corrections. A base or reference station location(s) is determined and stored. Either differential correction terms or raw satellite ranges are transmitted to GNSS-equipped remote or rover vehicles for use in differential GNSS (DGNSS) positioning and guidance operations. The base or reference station can be removed and later returned to the general area of its previous location, for which the GNSS position coordinates have been saved. If placed within a predetermined threshold distance of a previously-saved location, the base or reference station will "snap" to the saved reference location and compute GNSS corrector terms using the saved reference location data. Otherwise a new GNSS-based reference position will be computed for immediate use and added to the list of stored reference locations for future use.

What is needed then is a system and method designed to coordinate several base stations together to form one large region of differential guidance based off of a single "known" coordinate for a master base station. Doing this would ensure that when the working vehicle leaves the signal area of one base station and enters into another, the current path that the vehicle is traveling will not deviate or "jump" because of a difference in the "known" coordinates that the base station is basing its differential positional information upon.

DGNSS requires rover and base GNSS receivers. The base is typically stationary at a known location and sends to a rover GNSS receiver phase (or pseudo-range) observations plus its known location, or in lieu of this, differential correctors or other differential enabling data via radios or cell phones. The rover receives the correctors from the base(s) and uses them to correct its own satellite ranging signal observations to increase their accuracy. The result is that the rover can provide a more accurate location using corrected observations, even to the centimeter level or less when carrier phase is used in an RTK solution. The range of a base signal is, however, limited. For large fields or tracts of land, a master and multiple secondary base receivers may be needed to provide differential positioning data to the rovers to cover the entire region.

DGNSS base stations are used to generate and transmit GNSS corrections from base reference positions to rover DGNSS receivers, typically by radio or cellular telecommunication, to improve accuracy to RTK or near RTK (e.g., sub-centimeter) levels. Corrections are sent out from a base system, referenced to the coordinates set for the base, and either manually entered, automatically selected from a list of previously saved points, or automatically selected after a period of data averaging.

Most applications do not need absolute accuracy, but do require high relative accuracy during field operations, both within the same week and for subsequent field operations months or even years later. In agriculture, this allows for planting, cultivating, and harvesting with minimal field disturbance for water and soil conservation, including the ability to drive without damage to sub-surface drip tape used for high efficiency watering.

This invention allows a vehicle to base its entire pre-planned path upon the known coordinates of a single master base station, and then transfer those coordinates to calibrate other base stations as it enters the signal area of these secondary base stations, thus expanding the secondary base station network. Essentially, this invention will calibrate secondary base stations to the coordinate information of a single, master base station using a mobile transceiver device within a working vehicle.

SUMMARY OF THE INVENTION

In the practice of an aspect of the present invention, a master base station receiver can be either arbitrarily placed for relative positioning or surveyed-in for absolute positioning. The master base station references a master set of coordinates (XYZ), which can be manually entered, automatically selected from a list of previously saved coordinates or automatically selected after a period of data averaging.

A rover receives differential correction signals (DGNSS) from the master base station over a radio link for relatively precise guidance, for example centimeter-level using real-time kinematic (RTK) techniques. As the rover enters the coverage area of a secondary base station, new correction signals are received from the secondary base station, which can differ substantially (e.g., 1 m or more) from the master base station correction signals. Such offsets are typical with base stations receiving correction signals from the Wide Area Augmentation System (WARS) and other satellite-based augmentation systems (SBAS). These offsets cause an apparent GNSS-based position jump when the rover switches to the frequency of the secondary base station upon entering its coverage area. Merely averaging the inconsistent position correctors from the master and second base stations can still result in discrepancies of half a meter or more.

With the present invention the rover transmits these offsets over its radio link to the secondary base station for application to its correction data, which will then be conformed to align with the master base station correction data, thus eliminating the base-station-transition correction data jump. Correction data from the master and the secondary base stations thus align relatively precisely, thereby enabling seamless centimeter-level guidance as the rover travels from the master to the secondary base station coverage area.

A differentially-corrected-position network of base stations with overlapping coverage polygons can thus be expanded from the original master base station by computing the $\Delta X$ (latitude in degrees or meters), $\Delta Y$ (longitude in degrees or meters) and $\Delta Z$ (height in meters) offsets from the master coordinates for each secondary base station and applying these shifts at each secondary base station whereby the GNSS-based position discrepancies or "jumps" encountered while transitioning between base stations are minimized. The master-to-secondary positioning information shifts can either be manually entered at each secondary base station or automatically uploaded from the rover system, e.g. as the rover transitions between coverage areas around respective base stations. The rover thus functions to expand the network of overlapping, secondary base station coverage polygons as it traverses a working area and transmits shift-based data for conforming the correctors emanating from the secondary base stations.

The rover positioning system processor can define a list of base stations and their respective coverage area polygons for automatically switching the rover receiver frequencies to receive the correction signals from the base station(s) within range. The hysteresis effect maintains the rover receiver in contact with a current base station until the rover exits its coverage area polygon, whereupon correction data is received from another base station, to which the rover has transmitted the applicable master-to-secondary location coordinate offsets over the radio link. Likewise, the hysteresis effect will maintain the radio contact with the secondary base station until the rover leaves its coverage area, whereupon coverage from the master (or another secondary) base station seamlessly resumes.

The system can also save previously-generated secondary base location corrections for use in future operations, as described in U.S. Pat. No. 7,400,294, which is incorporated herein by reference. For example, if a secondary base receiver antenna is returned to within a defined distance (e.g., 5 m) from a previously-generated, saved secondary base station location, the secondary base location will be generated by averaging GNSS locations at that point, and corrections will be generated from rover-transmitted master base station correction data, as described above. An extra message will be transmitted from the secondary base station to the rover with the saved, previously-generated, secondary base location corrections. Saved base station locations can thus be reused for improving rover location repeatability for accurate relative positioning from previous DGNSS-guided operations within the coverage area.

BRIEF DESCRIPTION OF THE DRAWINGS

FIG. 2C is an aerial view showing master and secondary base station signal coverage polygons with the rover unit located in an overlapping coverage area.

FIG. 2D is an aerial view showing a positioning signal shift or jump between the master and secondary base station positioning signals used for locating the secondary base station in relation to the master base station.

FIG. 3 is an aerial view showing the reuse of a saved secondary base station location, including snapping to saved coordinates upon detection within a predetermined radius of the saved location.

DETAILED DESCRIPTION OF THE PREFERRED EMBODIMENTS

I. Introduction and Environment

Figure 1:
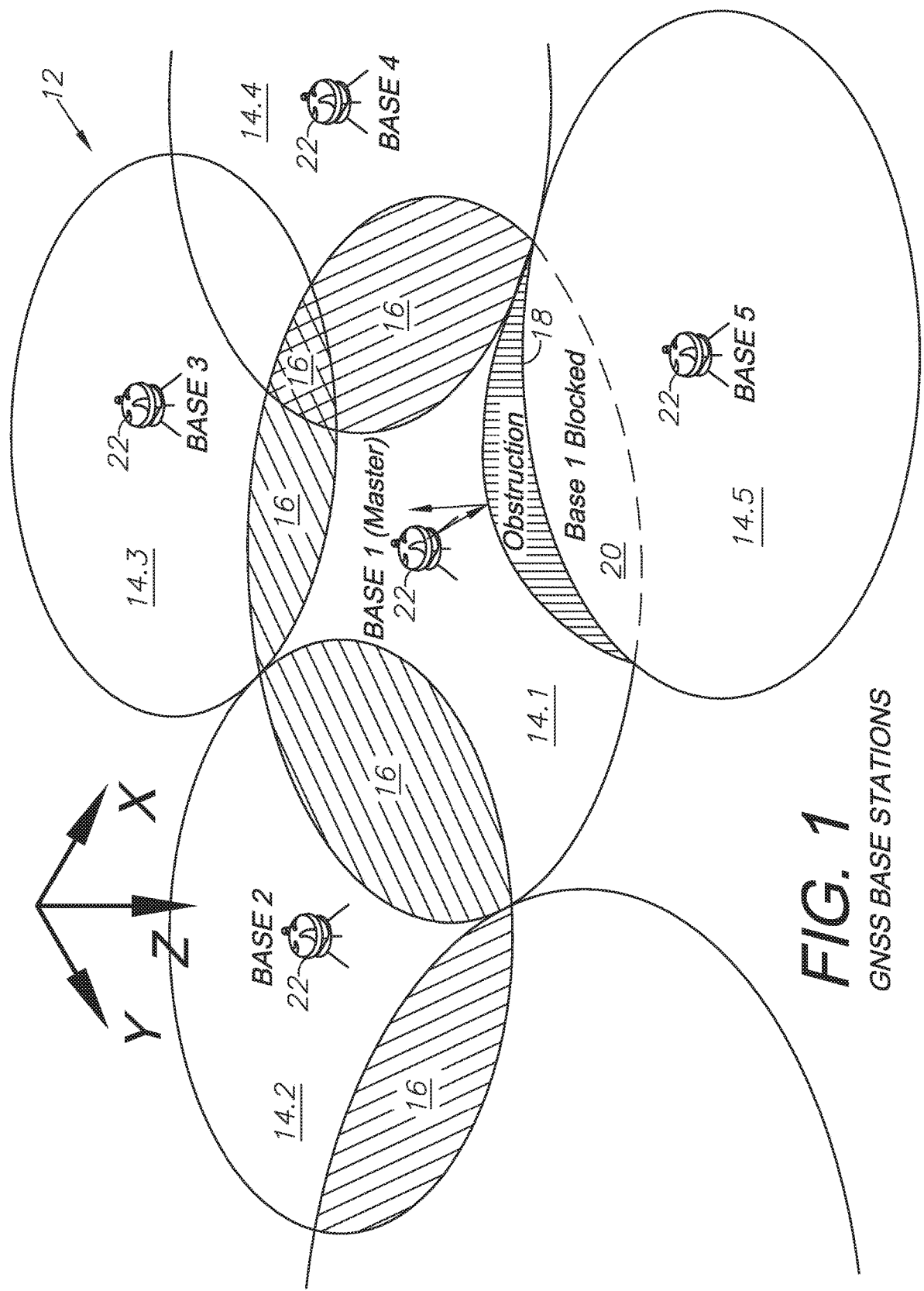
FIG. 1 is an aerial view of a control region with a master base GNSS transceiver and multiple secondary base GNSS transceivers each defining a respective signal coverage polygon.

As required, detailed aspects of the disclosed subject matter are disclosed herein; however, it is to be understood that the disclosed aspects are merely exemplary of the invention, which may be embodied in various forms, Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, hack, right and left refer to the invention as orientated in the view being referred to. Said terminology will include the words specifically mentioned, derivatives thereof and words of similar meaning.

Generally, a preferred embodiment of the present invention consists of equipping a vehicle with a rover guidance unit and situating a number of base station transceiver units over an area to be traversed. One base station will be identified as a "master" base station and should be positioned relatively near the vehicle starting position. The base stations and rover receiver should be programmed to track the same GNSS constellation(s), such as the global positioning system (GPS), Galileo, GLONASS, etc.

II. Portable Reference Station System 2

Referring to the drawings more detail, the reference numeral 10 generally designates a portable reference station system embodying the present invention and generally including a master base or reference station (base 1), multiple secondary base stations (bases 2-5) located in relation to the master base station 1, and a rover 11.

As shown in FIG. 1, a control region 12 generally includes multiple signal coverage areas 14.1-14.5 forming polygons around perspective base stations 1-5 each broadcasting differential correction terms at a respective, unique frequency. Overlaps 16 are formed by two or more overlapping coverage areas 14.1-14.5. An obstruction 18 is shown in coverage area 14.2 and could comprise a hill, a treeline, a structure or any other signal-blocking obstruction casting a signal shadow into a blocked sub-area 20. The base stations are preferably located to provide complete coverage of the control region with overlapping signal coverage areas whereby the rover 11 is always receiving GNSS differential correction signals from at least one base station, in addition to direct satellite ranging transmissions.

Figure 2A:
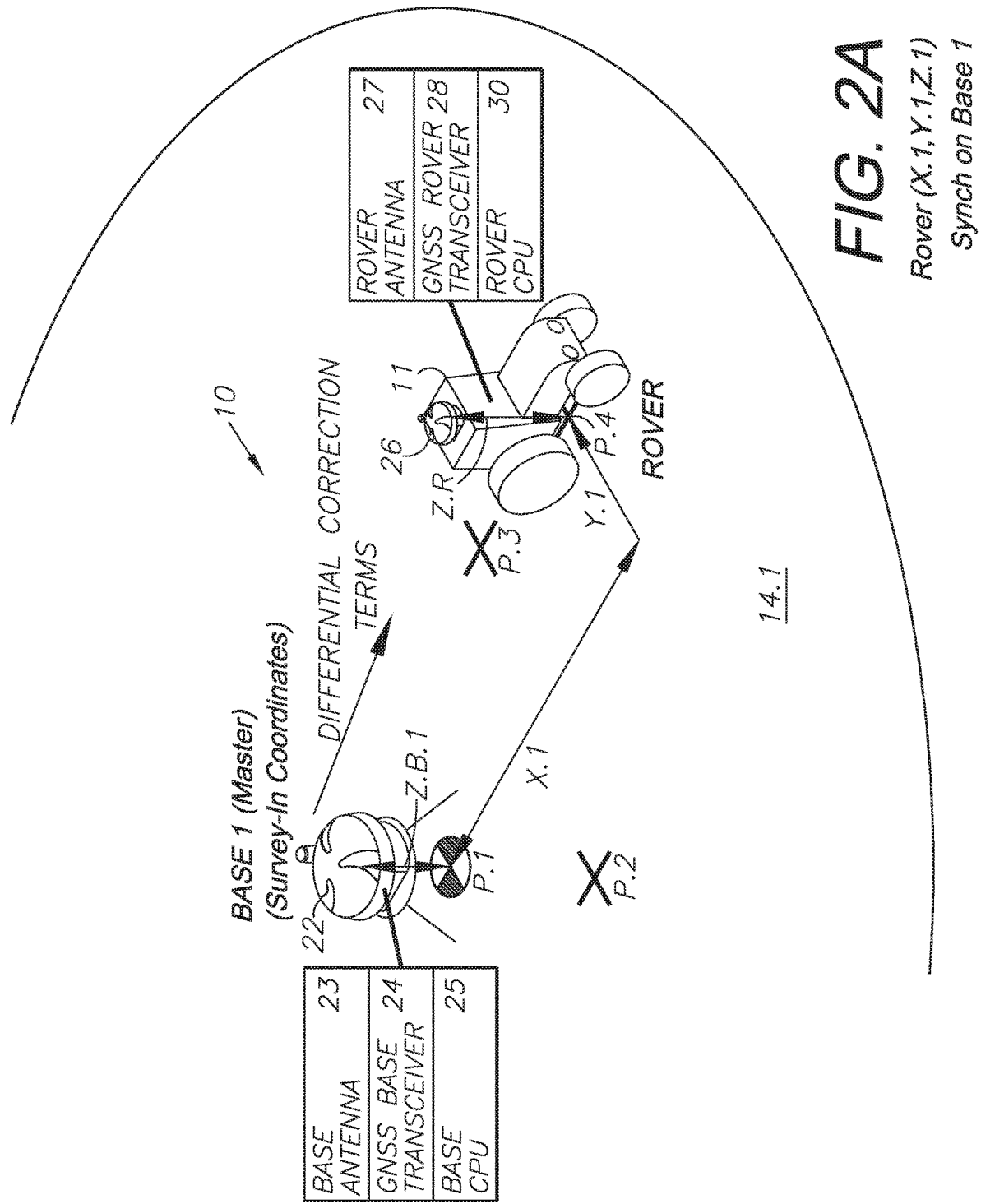
FIG. 2A is an aerial view of the master base station signal coverage polygon, showing a GNSS-equipped rover unit comprising a tractor and receiving differential GNSS correction terms.

FIG. 2A shows system 10 initialization with the rover 11 traversing coverage area 14.1 and receiving GNSS-based guidance from the master base station 1. Without limitation on the generality of useful GNSS receiver units, the base station 1 can include a smart antenna unit 22 as shown in U.S. patent application Ser. No. 61/377,355, which is assigned to a common assignee herewith and is incorporated by reference. The smart antenna unit 22 includes a base antenna 23, a base GNSS receiver 24 and a base CPU 25. Also without limitation, GNSS/RTK guidance and control systems and methods are shown in U.S. Patent Publication No. 2009/0164067, which is assigned to a common assignee herewith and is also incorporated by reference. The system 10 applies an XYZ offset to a data stream sent from a master base station smart antenna unit 22 to the rover smart antenna unit 26, which includes a rover antenna 27, a rover transceiver 28 and a rover CPU 30. This offset can be applied in real time either to the final position solution from the rover DGNSS or to the application using the rover DGNSS data. The terms X, Y, and Z can be in distance or degrees for latitude and longitude, and distances for altitude or any other combination of measurements.

The base station 1 is preferably installed at a predetermined location designated P.1, which can comprise a benchmark or monument for absolute positioning and can be located (i.e. "surveyed in") by conventional surveying techniques. For relative positioning, the location of P.1 can vary whereby the locations of the secondary base stations 2-5 are established relative to the location of base 1 at P.1. Additional GNSS-defined locations (e.g., P.2-P.4) can be established and recorded throughout the coverage area 14.1.

The rover 11 is positioned over P.4, which can comprise a "point-of-interest" on the ground, and is located by 2D, planar orthogonal coordinates X.1, Y.1 relative to the base station 1. The vertical axis Z coordinate at P.4 can be computed from Z.B.1 (at base station 1) and Z.R (at rover 11), and would be relatively constant on flat ground whereas the XY coordinates would be variable with the moving rover 11. Various GNSS-based positioning and guidance techniques can be utilized in connection with operating the rover 11, such as tilt compensation and articulated implement guidance and control. Moreover, the system 10 enables computing the locations of the smart antenna units 22, 26 as the points-of-interest, as well as ground locations forming guide paths and the locations of other objects, such as towed implements, in fixed and variable relations to the smart antenna units 22, 26.

Figure 2B:
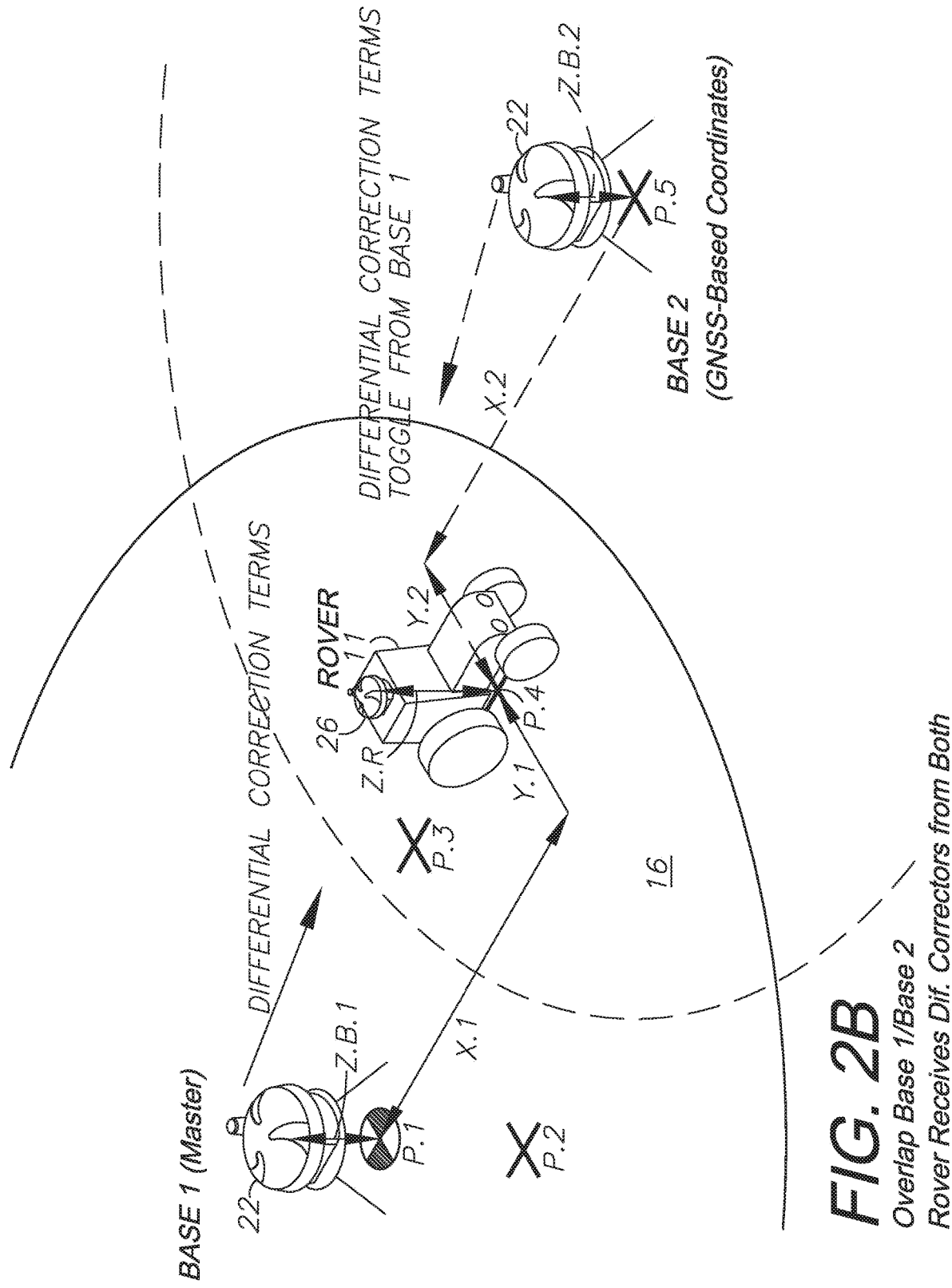
FIG. 2B is an aerial view showing master and secondary base station signal coverage polygons with the rover unit located in an overlapping coverage area.

FIG. 2B shows the rover 11 in an overlapping coverage area 16 and receiving GNSS differential correction terms from base stations 1 and 2. The rover antennae unit 26 can toggle signal reception between the base stations 1 and 2 automatically, e.g., based on signal strength, or the operator can manually select differential correctors from among the base stations within range of the rover 11.

FIG. 2C shows the rover 11 computing and uploading XYZ positioning signal shifts between base 1 and base 2, Such shifts or offsets can occur due to various contributing factors, such as satellite signal interference, multipath, atmospheric conditions, hysteresis, etc. The rover 11 transmits updated XYZ positioning terms (calculated relative to base 1) to base 2 for calibrating its own GNSS-defined position. GNSS-based positions can be accurately calibrated system-wide in relation to the master base station 1 by averaging location data from all of the base stations, as received at the rover as it moves among the coverage areas 14.1-14.5, and from satellite-direct ranging transmissions, as well as other real-time and stored position correcting data sources, including public and private subscription GNSS satellite-based augmentation systems (SBAS). Such system-wide updating and averaging functions tend to eliminate or at least minimize positioning signal jumps among the coverage areas. Moreover, as such XYZ coordinate shifts or offsets are detected by the rover smart antenna unit 26, they can be uploaded to suitable telecommunications links (e.g., radio or cell phone, FIG. 2C) and used as correction terms by the base CPU 25, or used as correction terms by the rover CPU 30. For example, FIG. 2D shows the XYZ shift correction terms (detected at the rover 11) being automatically or manually downloaded by the base station 2 for calibration relative to the master base station 1.

Figure 2E:
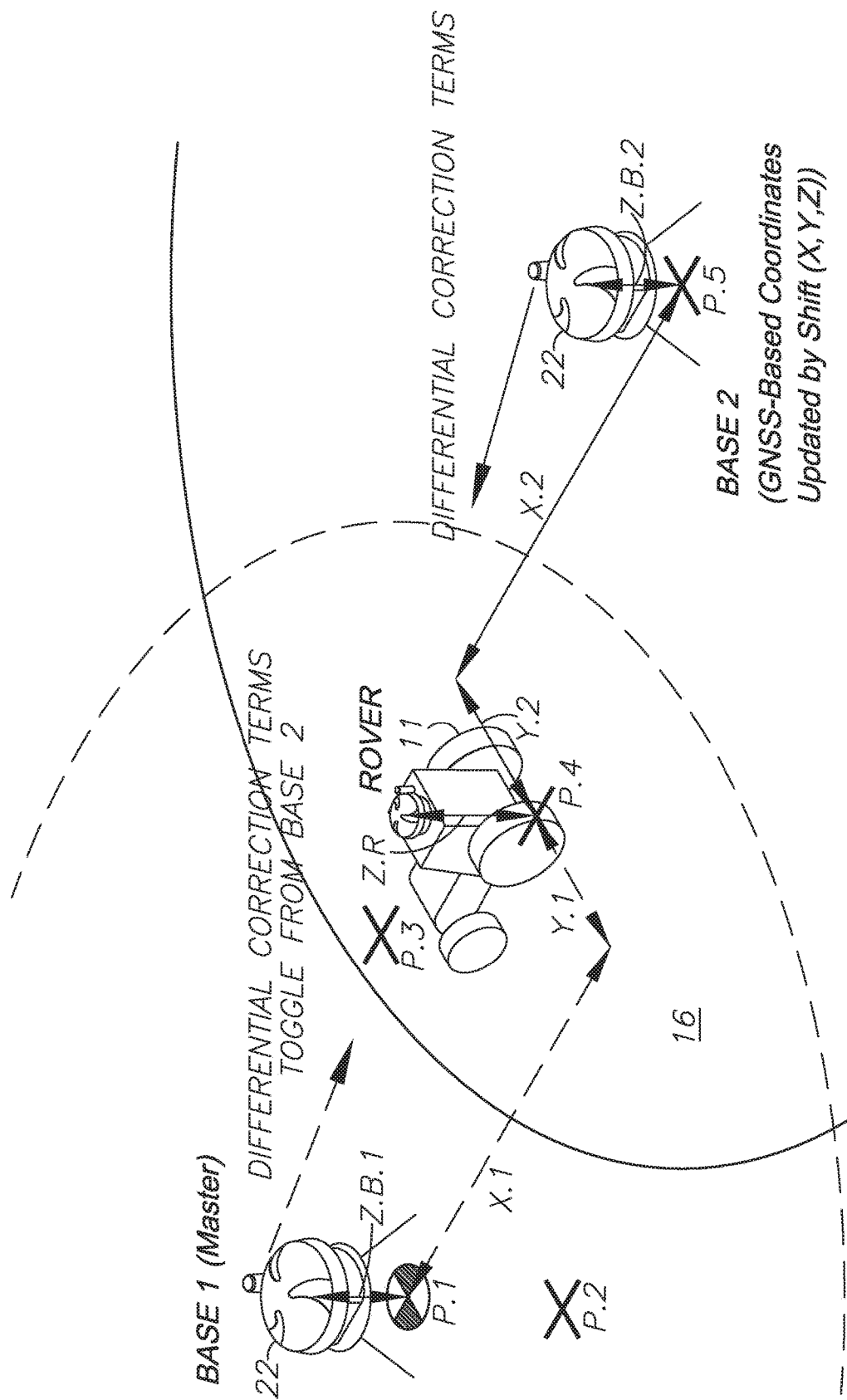
FIG. 2E is an aerial view showing the rover unit (tractor) reentering the master base station coverage polygon and toggling between the master and secondary base stations for differential correction terms.

FIG. 2E shows the rover 11 controlled by the base 2 and reentering the coverage area of base 1, with positioning signals available from both in the overlap 16. As described above, the rover smart antenna unit 26 can be programmed to update the base units providing signal coverage, whereby system-wide calibration is achieved as the rover 11 travels among the signal coverage areas 14.1-14.5. The rover smart antenna unit 26 preferably locks onto a base until its signal is lost, and then checks for available differential corrector signals from other bases. The rover 11 thus transitions among the base stations on-the-fly, with minimal location computation "jumps" while transitioning among bases. In a blocked-signal subarea, such as 20, the rover smart antennae at 26 can continue receiving differential correctors from another base, such as base 5 (FIG. 1), and satellite-direct ranging transmissions.

If no base station signal is picked up by the rover smart antenna unit 26, GNSS guidance can continue with satellite ranging signals received directly, but accuracy will be reduced due to the lack of the differential positioning component. However, the system 10 will continue checking for base station correction signals. Once a base station signal is picked up, the rover smart antenna unit 26 will guide the rover 11 along the preplanned path based on the base station signal that it picks up. To reduce this drop in signal and increase the ability to synchronize all base stations to the master base station, additional secondary base stations can be added throughout the field or the region where vehicle guidance is occurring. This allows for a network of base stations to be easily setup using automatic averaging and networked together by the application of a series of X, Y, and Z shifts.

Changing between the use of differential corrections from each base station in view will allow the calculation of a required X, Y, and/or Z shift from the master base station 1. These shifts will be applied to the secondary base station(s) 2-5 to make the position transitions from using base corrections from the master and secondary base stations minimized. This shift can either be entered manually at each secondary base station, or, in the preferred embodiment, automatically uploaded from the rover smart antenna unit 26. Using this method, additional base stations can be included within the network to create more overlapping Space; and thus reduce transitional error. Essentially, the rover 11 is acting to synchronize the secondary base station(s) 2-5 with the master base station 1.

The multi-base, position-averaging calibration method described, above is particularly useful in operations, such as agriculture, requiring precision and covering regions too large for a single base station. Moreover, agricultural and other repetitive operations can benefit from the repeatability of the system 10 whereby the same vehicle guide paths can be reconstructed and followed season-after-season. For example, even if the secondary base stations were removed during off seasons, they can be approximately relocated and the system 10 will reconfigure itself based on their new positions.

FIG. 3 shows a stored location snap function for reusing saved base locations. A base smart antenna unit 22 can be placed over a new location P.6. The smart antenna unit 22, which is receiving GNSS ranging signals, will compare its new computed location to a set of stored locations. If the new location is within a predetermined distance R, such as 5 m, of a previously-saved location, the smart antenna unit 22 will "snap" to the previously-saved location and use its coordinates for calibrating an updated location using the rover-linked, multi-base position averaging procedures described above.

This method of an X, Y, Z offset can be made automatic by a DGNSS base station. At each reference point occupied when base corrections are generated, the base location used can be saved into the CPU memory of the rover 11, as well as the base station's internal memory. If the base station is returned to within a defined distance from those series of saved locations, such as within five meters, the base location will be generated from averaging DGNSS locations at that point and corrections generated previously. In addition, an extra message will be transmitted occasionally that includes the X, Y, Z error from that close, previously occupied base location. This shift will be applied by the rover 11 to shift the used position to utilize the reference position of the previously occupied base location. This allows easy reuse of base locations and improved repeatability of vehicle travel locations giving accurate relative positioning from previous work carried out in the area. This is particularly useful for farm operations where repeating paths benefits in lower crop damage and soil erosion.

It is to be understood that while certain aspects of the disclosed subject matter have been shown and described, the disclosed subject matter is not limited thereto and encompasses various other embodiments and aspects. The above-mentioned steps and components are not meant to limit the use or organization of the present invention. The steps for performing the method may be performed in any logical method and the process can be used for other types of processes when viable.

The invention claimed is:

1. A positioning system, comprising:
a computer system located in a vehicle and configured to:
receive first position signals from a master base station;
receive second position signals from a secondary base station;
determine a position shift between the first position signals and the second position signals; and
upload the position shift to the secondary base station to calibrate the second position signals relative to the first position signals.

2. The positioning system of claim 1, wherein the first position signals from the master base station and the second position signals from the secondary base station are differential correction signals.

3. The positioning system of claim 1, wherein the computer system is further configured to transmit the position shift to the master base station and the secondary base station.

4. The positioning system of claim 1, wherein the computer system is further configured to upload the position shift to the secondary base station over a radio or cellular communication link.

5. The positioning system of claim 1, wherein the computer system is further configured to:
calculate different position shifts for different locations of the secondary base station;
save the different position shifts for the different locations of the secondary base station;
determine a current global navigation satellite system (GNSS) location for the secondary base station;
identify one of the different locations closest to the current GNSS location as a closest GNSS location; and
use one of the saved position shifts for the closest GNSS location to determine the location of the vehicle.

6. The positioning system of claim 1, wherein the computer system is further configured to use the calibrated second position signals to determine the location of the vehicle when the vehicle transitions into a coverage area of the secondary base station.

7. The positioning system of claim 6, wherein the computer system is further configured to use the first position signals of the master base station to determine the location of the vehicle when the vehicle transitions back into a coverage area of the master base station.

8. The positioning system of claim 6, wherein the computer system is further configured to:
    determine an average for position shifts between the master base station and different secondary base stations; and
    use the average of the position shifts to determine the location of the vehicle.

9. The positioning system of claim 1, wherein the computer system is further configured to:
    receive the first position signals from the master base station and the second position signals from the secondary base station when the vehicle is located in an overlapping coverage area of the master base station and the secondary base station; and
    use the first position signals from the master base station to determine the location of the vehicle when the vehicle is in the overlapping coverage area.

10. The positioning system of claim 9, wherein the computer system is further configured to:
    detect a blocked-signal area within the overlapping coverage area where signals from the master base station are blocked; and
    use the calibrated second position signals from the secondary base station to determine the location of the vehicle when the vehicle is in the blocked-signal area.

11. The positioning system of claim 1, wherein the computer system is further configured to:
    determine an additional position shift between the first position signals of the master base station and third position signals from a third base station; and
    upload the additional position shift to the third base station to calibrate the third position signals relative to the master base station.

12. A method for using a computing device, comprising:
    determining a global navigation satellite system (GNSS) based position for a secondary base station;
    receiving a position shift between the GNSS based position and a position of a master base station;
    updating the GNSS based position of the secondary base station with the position shift; and
    sending the updated GNSS based position to vehicles within a coverage area of the secondary base station.

13. The method of claim 12, including receiving the position shift from a vehicle transitioning from a first coverage area of the master base station to a second coverage area of the secondary base station.

14. The method of claim 12, further comprising:
    saving different locations and associated GNSS based positions for the secondary base station;
    determining a current location of the secondary base station;
    identifying one of the different locations closest to the current location; and
    use one of the saved GNSS base positions for the identified one of the different locations as the GNSS based position of the secondary base station.

15. The method of claim 12, further comprising:
    saving locations for the secondary base station as associated differential correction data;
    determining a current location of the secondary base station; and
    generating differential correction data for the current location by averaging the differential correction data for some of the saved locations closest to the current location.

16. The method of claim 12, further comprising reusing the position shift for new locations of the secondary base station.

17. A global navigation satellite system (GNSS) based positioning system, comprising:
    a secondary base station configured to:
    receive a position offset between first position signals for a master base station and second position signals for the secondary base station;
    use the position offset to adjust the second position signals relative to the first position signals; and
    send the adjusted second position signals to a vehicle within a coverage area of the secondary base station.

18. The positioning system of claim 17, wherein the secondary base station is further configured to receive the position offset from a vehicle moving into an overlapping coverage area of the master and secondary base stations.

19. The positioning system of claim 17, wherein the secondary base station is further configured to:
    save different base locations and associated location data for the secondary base station;
    determine a current location of the secondary base station;
    identify one of the saved base locations closest to the current location; and
    generate the second position signals for the secondary base station based on the location data associated with the closest one of the saved base locations.

20. The positioning system of claim 19, wherein the secondary base station is further configured to generate the second position data by averaging the location data associated with multiple saved base locations closest to the current location.

* * * * *